United States Patent [19]

Gryder

[11] Patent Number: 5,232,588
[45] Date of Patent: Aug. 3, 1993

[54] ENVIRONMENTALLY BENEFICIAL BYPASS FILTER SYSTEM FOR USE WITH LOW PRESSURE CENTRIFUGAL REFRIGERATION EQUIPMENT

[75] Inventor: Edd D. Gryder, 10702 W. U.S. Hwy. 14, Evansville, Wis. 53536

[73] Assignees: Edd D. Gryder, Evansville, Wis.; William Kent Oberman, Fort Collins, Colo.; James Patrick Graham, Pierre, S. Dak.

[21] Appl. No.: 784,572

[22] Filed: Oct. 29, 1991

[51] Int. Cl.$^5$ ............................................. F01M 11/03
[52] U.S. Cl. .................................... 210/168; 210/234; 210/314; 210/416.5; 210/508; 62/468; 184/6.24; 417/228
[58] Field of Search ............. 184/6.24; 417/228; 62/292, 468; 210/168, 314, 234, 508, 416.5

[56] References Cited

U.S. PATENT DOCUMENTS

| | | | |
|---|---|---|---|
| 2,341,429 | 2/1944 | Elsey | 62/170 |
| 3,145,544 | 8/1964 | Weller | 62/195 |
| 3,163,999 | 1/1965 | Ditzler et al. | 62/469 |
| 3,208,596 | 9/1965 | Gravert et al. | 210/307 |
| 3,650,634 | 3/1972 | Osborne et al. | 415/175 |
| 3,662,858 | 5/1972 | Peterson | 184/103 |
| 3,699,781 | 10/1972 | Taylor | 62/474 |
| 3,824,980 | 7/1974 | Hollins | 123/196 |
| 3,954,611 | 5/1976 | Reedy | 210/71 |
| 4,032,312 | 6/1977 | Anderson | 62/498 |
| 4,053,398 | 10/1977 | Venema | 210/41 |
| 4,104,044 | 8/1978 | Lange | 62/324 |
| 4,110,998 | 9/1978 | Owen | 62/125 |
| 4,144,722 | 3/1979 | Mattwell | 62/305 |
| 4,213,307 | 7/1980 | Watson | 62/192 |
| 4,255,940 | 3/1981 | Grahl | 62/324.3 |
| 4,261,178 | 4/1981 | Cain | 62/149 |
| 4,404,812 | 9/1983 | Zinsmeyer | 62/84 |
| 4,480,446 | 11/1984 | Margulefsky et al. | 62/292 |
| 4,534,860 | 8/1985 | Budzich | 210/137 |
| 4,586,825 | 5/1986 | Aman, Jr. | 184/6.24 |
| 4,591,433 | 5/1986 | Budzich | 210/114 |
| 4,687,572 | 8/1987 | Budzich | 210/114 |
| 4,753,724 | 6/1988 | Womble | 210/180 |
| 4,780,204 | 10/1988 | Rasmussen | 210/314 |
| 4,792,397 | 12/1988 | Rasmussen | 210/314 |
| 4,805,416 | 2/1989 | Manz et al. | 62/292 |
| 4,830,745 | 5/1989 | van der Meulen | 210/168 |
| 4,838,040 | 6/1989 | Freeman | 62/475 |
| 4,892,667 | 1/1990 | Parker et al. | 210/799 |
| 4,895,649 | 1/1990 | Brandt et al. | 210/195.2 |
| 4,929,354 | 5/1990 | Meyering et al. | 210/321 |
| 4,931,187 | 6/1990 | Derham et al. | 210/662 |
| 4,936,986 | 6/1990 | Tarves, Jr. | 210/321 |
| 4,966,693 | 10/1990 | Brandt et al. | 210/195.2 |
| 4,975,188 | 12/1990 | Brunsell et al. | 210/324 |

Primary Examiner—Robert A. Dawson
Assistant Examiner—David Reitsnyder
Attorney, Agent, or Firm—Luke Santangelo; Robert W. Diehl

[57] ABSTRACT

A bypass filter system for use in low pressure, centrifugal type refrigeration equipment which allows complete isolation of a submicron filter element from the lubrication system through use of an inlet line shut-off and a return line shut-off. The filter system utilizes a variable regulator valve for balancing the operating parameters of the various systems involved to permit initial installation and set up, at which point thereafter the variable regulator may be replaced with a fixed regulator for continued operation of the system. Multiple devices for monitoring the filter element condition, verifying flow, detecting moisture, and displaying pressure readings may be used in conjunction with the basic device to enhance reliability and usefulness. The invention may further be enhanced by the utilization of valves which allow samplings of the unfiltered and filtered oil, such samplings being subjected to tests to verify the improved quality of the filtered oil, indicating proper operation of the system, or to verify a system degradation by showing an unimproved filtered sampling.

45 Claims, 6 Drawing Sheets

OIL SUPPLY PRESSURE GAUGE
(gauge is generally
remotely located)

→ TO 10

FROM 30

ENVIRONMENTALLY BENEFICIAL BYPASS FILTER SYSTEM FOR USE WITH LOW PRESSURE CENTRIFUGAL REFRIGERATION EQUIPMENT

FIELD OF THE INVENTION

This invention relates to bypass filter systems for lubricating oil, and particularly bypass filter systems used in refrigeration equipment. More specifically, the invention relates to bypass filter systems used in low pressure, centrifugal type refrigeration equipment.

BACKGROUND OF THE INVENTION

Like almost all machinery with moving parts grinding together, refrigeration equipment needs proper lubrication to operate. Good lubrication with clean oil can maintain a refrigeration compressor in service for extended periods with little other maintenance. A poor oil quality can cause continual problems, some of which may go unnoticed until the equipment has a catastrophic breakdown.

Unlike other machinery, such as a car engine, however, the oil in a refrigeration system cannot practically be changed every two months to assure a clean system. The reason is related to ozone depletion. Each time refrigeration equipment is opened or purged there is some release of refrigerant, usually CFC, to the atmosphere. This has been linked to the alarming decimation of the earth's ozone layer—the once thick blanket of $O_3$ which helps to filter out harmful components of the sun's rays. Thus lubrication maintenance for refrigeration systems has evolved to its own unique process.

Historically, the oil used to lubricate and cool the moving parts in refrigeration equipment, such as chillers, has been drained and replaced annually. The service branch of the equipment manufacturer would haul away and dispose of the used oil as would other outside service vendors. More recently, individuals and companies have frequently paid a fee as a built-in cost in a service contract to have their waste oil hauled away. Some of the oil was reclaimed, after which it could then be resold, usually as a lower grade oil.

However, changes are rapidly taking place in the industry. It is becoming increasingly difficult as well as costly to arrange for disposal of the oil. Great concerns have been raised by various government agencies regarding such oil as a hazardous waste. More alarming is the anxiety created by the release of harmful refrigerants into the atmosphere each time the seal is broken on these refrigeration devices. Most notably is the low pressure centrifugal type equipment which uses R-11 refrigerant. Those still using the machinery continually face fines for the release of R-11 above a certain mandated amount. It is believed that literally hundreds of thousands of these offenders exist.

The present invention has sought to address these problems in the low pressure centrifugal type refrigeration equipment. And in fact, the present invention has sought to anticipate further restrictions and problems linked to pending legislation which may reduce the limits for release of R-11 into the atmosphere.

In understanding the nature of the problem addressed, it is essential that a distinction be made between the low pressure class of equipment and their heavily legislated high pressure counterparts. Because the low pressure class of systems have presented far less safety risks in the industry they have been almost unrestricted in their use. On the other hand, equipment classified as high pressure has evolved under continuous restriction. The high pressure class of equipment is forced to meet countless ASHRAE/ASME/ANSI/ASTM codes. This of course increases the cost of the refrigeration equipment dramatically. High pressure centrifugal equipment requires more KW per ton of cooling than its counterpart (low pressure), and is dramatically more dangerous to operate. Maintenance costs are higher for the high pressure vessels, and the operating staff must be more specialized than those operating the low pressure machines. Perhaps a key difference is that the high pressure machine has no vacuum on the low side line and is generally tested at between 300 pounds per square inch (psi) to 600 psi. The result of this greater-than-atmospheric pressure internally is that air does not leak into the equipment during operation. Atmospheric leaks into refrigeration equipment are instrumental to mechanical degradation, and particularly harmful to the lubricating oil. When high pressure machines are tight and properly evacuated at start-up or after service, internal moisture does not become a factor in their operation. For this reason, high pressure machines do not have, or need, an automatic purge cycle to keep air out of the system.

Conversely, low pressure equipment, the focus of the present invention, has been much less regulated. Presently it does not have to meet the regulations set forth by the higher pressure vessels. These machines are generally tested at 30 psi and operate under 15 psi. They may reach 15" (Hg) of vacuum on the low (suction) line side, and even lower during evacuation of the filter housing. Typically, the low pressure machine is about 35% larger than high pressure centrifugal equipment. Depending on internal and external conditions, while the machine is in its idle off-state, the equipment will assume a negative pressure internally. This negative pressure state constantly has the potential of allowing air to leak into the system. Each leak is the possible propagator of catastrophic failure. As the temperature falls inside the machine the water vapor within the atmosphere condenses into droplets on the metal surfaces. The water in turn reacts with other contaminants to produce acids that may break down motor windings and erode metal surfaces. To help counter-act this problem, those skilled in the art have utilized a purge pump. The pump automatically starts when air or water is present in the purge system and stops when the air and/or water has been removed. Not only does this pump push the air out of the machine, but a significant amount of the refrigerant leaves as well. The process of the present invention traps the water, thus reducing the amount of run time of the purge pump and thus reducing the amount of R-11 pumped into the atmosphere.

These distinct differences between high and low pressure refrigeration equipment have led those skilled in the separate arts to address very different problems. To these persons skilled in the representative arts, what generally applies to one, such as internal equipment leaks in low pressure, does not necessarily apply to the other. Furthermore, while the use of the purge pump system addresses the problem of water contamination in a low pressure system, it does so at the cost of more important environmental concerns.

Ancillary to the high vs. low pressure classification is the distinction between refrigeration equipment types. In the field there exists centrifugal type equipment, as shown in U.S. Pat. Nos. 4,404,812 to Zinsmeyer, 4,032,312 to Anderson, 3,650,634 to Osborne et al., and 3,163,999 to Ditzler et al., and piston and screw type equipment, as shown in U.S. Pat. No. 4,586,875 to Aman, Jr. (piston type compressor). The latter two types are strictly high pressure class equipment with very different lubrication and operational concerns, while centrifugal type equipment can be either low pressure or high pressure. The present invention focuses on the low pressure centrifugal type equipment.

Some of the major problems inherent to low pressure, centrifugal type refrigeration equipment are water caused by condensation, and water due to leaks in the oil cooler system. As this water mixes within the system it forms hydrochloric acid (HCl), an extremely caustic acid. The acid tends to degrade the system by destroying internal parts. Several devices, such as that disclosed in U.S. Pat. Nos. 4,975,188 to Brunsell et al., 4,830,745 to van der Meulen, 4,687,572, 4,591,433, and 4,534,860 all to Budzich, teach the removal of water from lubricating oil, but the oil must first be removed from the lubricating system. These particular devices are called centrifugal type separators, not to be confused with centrifugal type refrigeration equipment. The separators subject the oil/water mixture to high velocity centrifuging to obtain separation of the various liquids. The water is then drawn off to leave just the oil. Separators of this type are not well suited for use in refrigeration equipment because of their size—they are typically suited for large volume separation—and cost.

In U.S. Pat. Nos. 3,208,596 to Gravert and 4,892,667 to Parker III, et al., water removal is taught in lubricating oil systems using coalescing filters. This procedure consolidates tiny water droplets into larger water droplets which, when they reach a certain size, may be removed by gravity. Gravert uses hydrophobic screen separators (10 microns average opening size) to block the passage of any water droplets, while still allowing the passage of oil. The very size of the coalescing apparatus does not make it a practical solution to the water problem in low pressure centrifugal refrigeration equipment.

Somewhat related to the problem of water contaminants is that of minute or submicron particles. As these tiny contaminants build up in any type of machinery they can cause great wear and tear on the moving parts. In full flow filtering systems, submicron filtering is not achievable because of the necessary retention needed to be effective. Longer retention of the oil in these full flow systems would naturally cause the lubrication system to be starved of oil, or perhaps require an impractical amount of surplus oil to operate. Thus, bypass filters have been used to provide submicron filtering for smaller portions of the oil supply. After several passes through the bypass system as much as 98% of these submicron particles can be removed. However, in low pressure centrifugal refrigeration equipment one is presented with the problem of sufficient filtering due to a positive pressure inlet side and a negative pressure on the low (suction) side. Under these circumstances the oil has a tendency to exit the filtering unit without being adequately retained for effective filtration. Those having representative skill in the art have not recognized the benefits of balancing the operating parameters of the filtering system to sufficiently filter oil at a submicron level without starving the lubrication system. Attempts have been made to control the inlet portion of oil, but efforts have fallen short of metering the return of filtered oil. This is particularly true for newly established equipment which has no guidelines to follow for setting these parameters correctly. The present invention is designed to allow careful balancing of the essential operating parameters to provide a reliable oil filtering system on both existing and new systems.

One of the most difficult situations faced by those using the low pressure centrifugal refrigeration equipment is the need to shut down the equipment for routine filter and oil changes. The process can involve several hours of discontinued operation of the equipment. Due to the considerable cost involved there is little redundancy in the field of cooling apparatus (i.e., use of backup systems). Shutting a cooling system down for even a short period of time can cause a considerable amount of inconvenience. Yet all known devices require discontinued operation of the refrigeration system to carry out a routine maintenance procedure such as changing the oil filter. Perhaps surprisingly, those skilled in the art did not realize that it would be possible to isolate the filtering system entirely, thereby permitting continued operation of the lubricating system and therefore continued operation of the refrigeration equipment during routine oil and filter changes. Certainly bypass filter systems have been known for some time. However, one which allowed the filter to be changed without discontinuing operation of the equipment had not, until the present invention, been available in refrigeration systems.

Environmentally, the main concern however, with shutting down the machine is more the release of CFC's into the atmosphere. As alluded to earlier, there are numerous government agencies which have sought to impose stiff penalties on R-11 users. With the annual release of R-11 into the atmosphere by approximately 500,000 low pressure centrifugal type refrigeration systems, the environmental impact becomes quite alarming. Such dangers of refrigerant release into the atmosphere are well documented in U.S. Pat. Nos. 4,805,416 to Manz et al., 4,261,178 to Cain, 4,110,998 to Owen, 3,699,781 to Taylor, 3,145,544 to Weller, and 2,341,429 to Elsey. The present invention would require less frequent maintenance to replace degraded lubrication oil. It is anticipated that oil changes could be performed every five years, rather than the standard one year. These changes could be coincided with the specification check-ups which are performed every five years as well. Theoretically the reduction of R-11 released into the atmosphere each year would be 80%. The key to this practice would be to maintain the oil in a suitable lubricating state, without degradation due to contaminants.

The present invention, in both its apparatus and methods, recognizes and addresses these problems and overcomes the limitations perceived by those skilled in the art by presenting a design which, among other aspects, allows for the removal of water, glycol and submicron particles without having to shut down the refrigeration system. Those skilled in the art of low pressure centrifugal refrigeration equipment design have long been aware of these problems of water degradation of oil, submicron particle impurities, and environmental contamination. Millions of dollars have been spent to date in both research and fines by those using low pressure centrifugal equipment. All the while the necessary arts and elements for implementing the disclosed invention have existed for sometime. The various patents cited show substantial attempts by those skilled in other fields to solve each of the above problems separately as they exist in their particular art. That is, some have been able to remove submicron particles from lubricating oils, others have accomplished water removal by oil reclamation or by use of the standard purge pump, and still others have addressed the environmental concerns. However, a system which integrates these capabilities into the permanent filtering system of low pressure centrifugal type refrigeration equipment has not existed until the present invention. Instead of understanding the true problem, manufacturers have coped with the inherent limitation to some of these devices and methods, such as the purge pump. There appeared to be a failure to fully understand the problems and impacts of properly filtering lubricating oil in low pressure centrifugal type refrigeration equipment.

SUMMARY OF THE INVENTION

The present invention discloses a bypass filtering system to operate in conjunction with low pressure centrifugal type refrigeration equipment. The device provides a reliable and efficient method for filtering lubricating oil. Rather than supplying a system which affords only an incremental increase in performance and design over the prior art, the present invention utilizes techniques which were not previously considered to achieve leaps in performance compared to the prior art. This invention serves to optimize cost efficiencies for the user by requiring less frequent maintenance, to optimize the reliability of the refrigeration system, and to optimize solutions to environmental concerns.

In general terms, the invention involves embodiments of both methods and apparatus. Many of the elements of this system achieve several different objects which, when combined, act to achieve the mentioned leaps in performance. In one embodiment, the invention discloses shut-off valves for isolating the bypass filter system from the lubricating system, allowing continued operation of the refrigeration equipment during routine filter changes. In another embodiment, the filtering system is capable of removing harmful water and glycol contaminants. In still other embodiments, the present system discloses the use of pressure gauges and moisture eyes to verify operation and monitor filter element conditions.

Importantly, the invention breaks from several time-honored traditions in filtering lubrication oil in a refrigeration system. While drawing from some of the important conditions demanded of these devices for providing an effective filter system, the invention expands upon these conditions in an effort to provide an efficient and reliable device. With submicron particle removal by the filtering element, oil degradation can be impeded to minimize maintenance requirements and thereby reduce environmental harm. By recognizing and utilizing the advantages of complete isolation of the filter system the present invention achieves its goals.

Accordingly, the present invention provides a bypass filter system method and device which isolates the filter element from the lubrication system. The stated device provides means for monitoring and detecting ineffective filter elements and water leaks, whereby the filter element may be isolated and replaced without disruption of the continued operation of the refrigeration system. The present device may include flow regulators for properly balancing the operation parameters of the various systems involved. In addition, the device utilizes submicron filter elements in a manner to further facilitate impedance of oil degradation.

One object of the present invention is to provide a design which avoids starving the lubricating system of oil, while providing proper filtration of the oil. It is therefore an object to provide a means for balancing the operating parameters of the various systems involved on both existing and new refrigeration equipment. These means may be supplied by monitoring and controlling the return flow rate in the filter element, or they may also be accomplished by maintaining suitable retention of the oil in the filter element.

It is also an object of the present invention to provide a design which allows isolation of the filter element by means of both an input and return flow shut-off valve. As a benefit the present invention is capable of allowing the refrigeration equipment continued operation during routine filter changes.

It is another object of one embodiment of the present invention to provide a design which removes harmful contaminants at all levels. That is, a system which can remove large particle contaminants, as well as submicron contaminants, as well as liquid contaminants, such as water or glycol. It is an object to enable the present invention to extend the usable life of the machinery as well as the oil by such filtration.

Another object of the present invention is to provide a design which monitors the physical state of the submicron filter element. By such, the present invention is capable of such an object as detecting water leaks in ancillary systems, such as the oil cooler system coil. Gauges which monitor the pressure within the filter element housing react to filter degradation, due to particle build up or increased water absorption, by displaying the resultant higher pressure readings. It is an object that such a system serve as an early warning to operators of suboptimal conditions.

Naturally, other objects of the present invention are disclosed throughout various areas of the specification and claims.

BRIEF DESCRIPTION OF THE DRAWINGS

The following descriptions and referenced drawings are for selected preferred embodiments of the present invention. Naturally, changes may be made to the disclosed embodiments while still falling within the scope and spirit of the present invention and the patent granted to its inventors.

DETAILED DESCRIPTION OF THE PREFERRED EMBODIMENT

Figure 1:
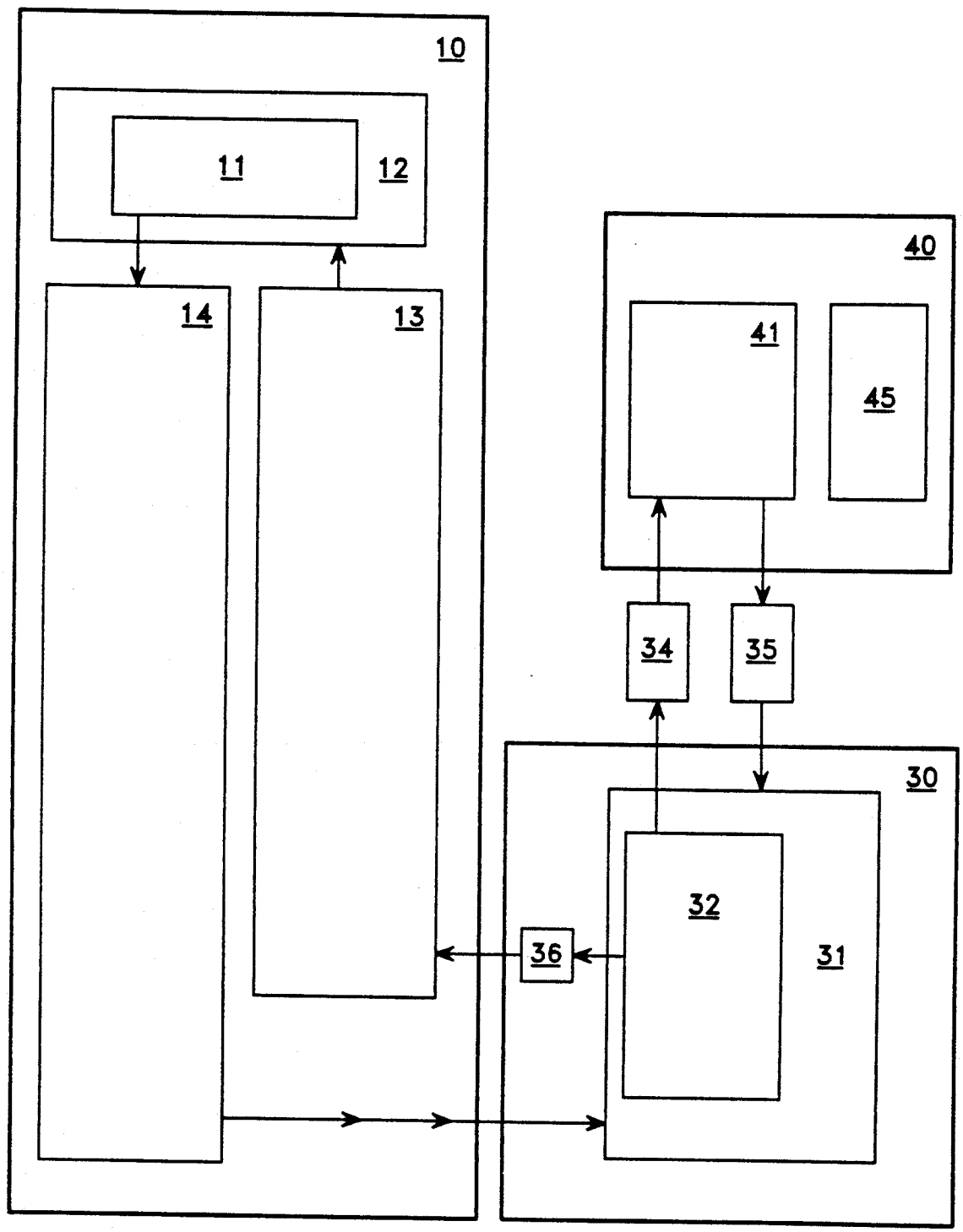
FIG. 1 is a block diagram showing the basic elements of the present invention and their relationship to one another. The arrows illustrate the direction of travel of the oil in the entire system.

As can be seen from the drawings, the basic concepts of the present invention may be embodied in a variety of ways. FIG. 1 represents, in a block diagram form, the basic elements of low pressure centrifugal type refrigeration system (40), such as oil pump (32), oil reservoir (31), compressor (41) and bypass filter system (10). In general, oil situated in reservoir (31) is maintained under a vacuum pressure. Oil pump (32) creates the pressure and forces oil through oil supply line (34) and oil return line (35). From Oil pump (32) the oil can be circulated to the various moving parts of compressor (41). The present invention is integrated into this system by cutting into oil supply pressure gauge line (36)—the positive pressure side of pump (32)—with inlet line (13) and displacing existing oil drain valve (38) (as shown in FIG. 2)—on the negative or suction side of pump (32)—with outlet line (14).

While the designs and concepts disclosed herein focus upon and may find use for the refining of oil in a bypass filter system of low pressure centrifugal refrigeration equipment, it may also obviously find use in a very wide variety of other applications. It, therefore should be understood that while the field of application of the invention is discussed in the limited context, the scope of protection afforded is not intended to be so limited.

Figure 2:
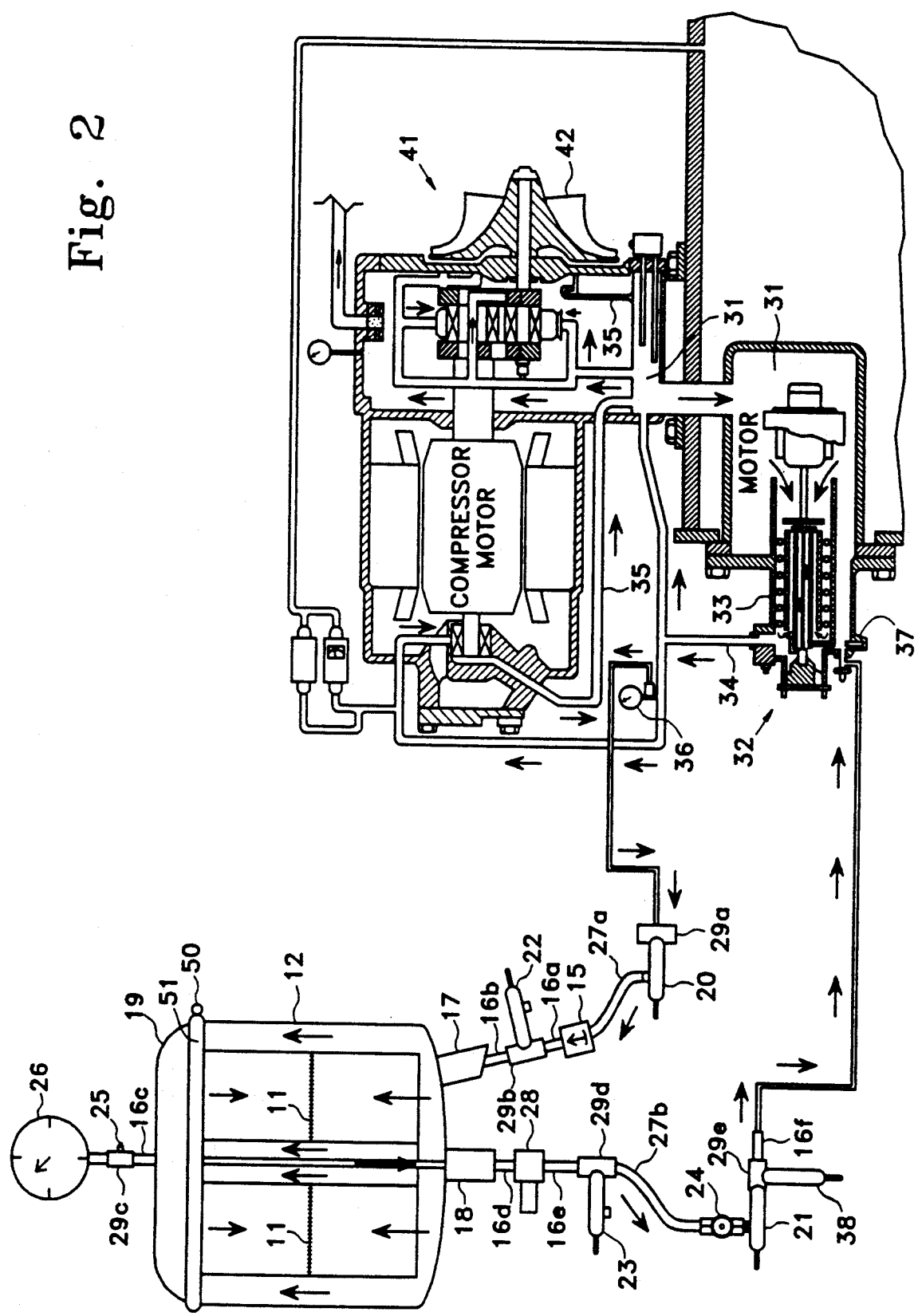
FIG. 2 is a detailed side view of the bypass filter system as it would be attached to the oil pump in low pressure centrifugal type refrigeration equipment.
Figure 3:
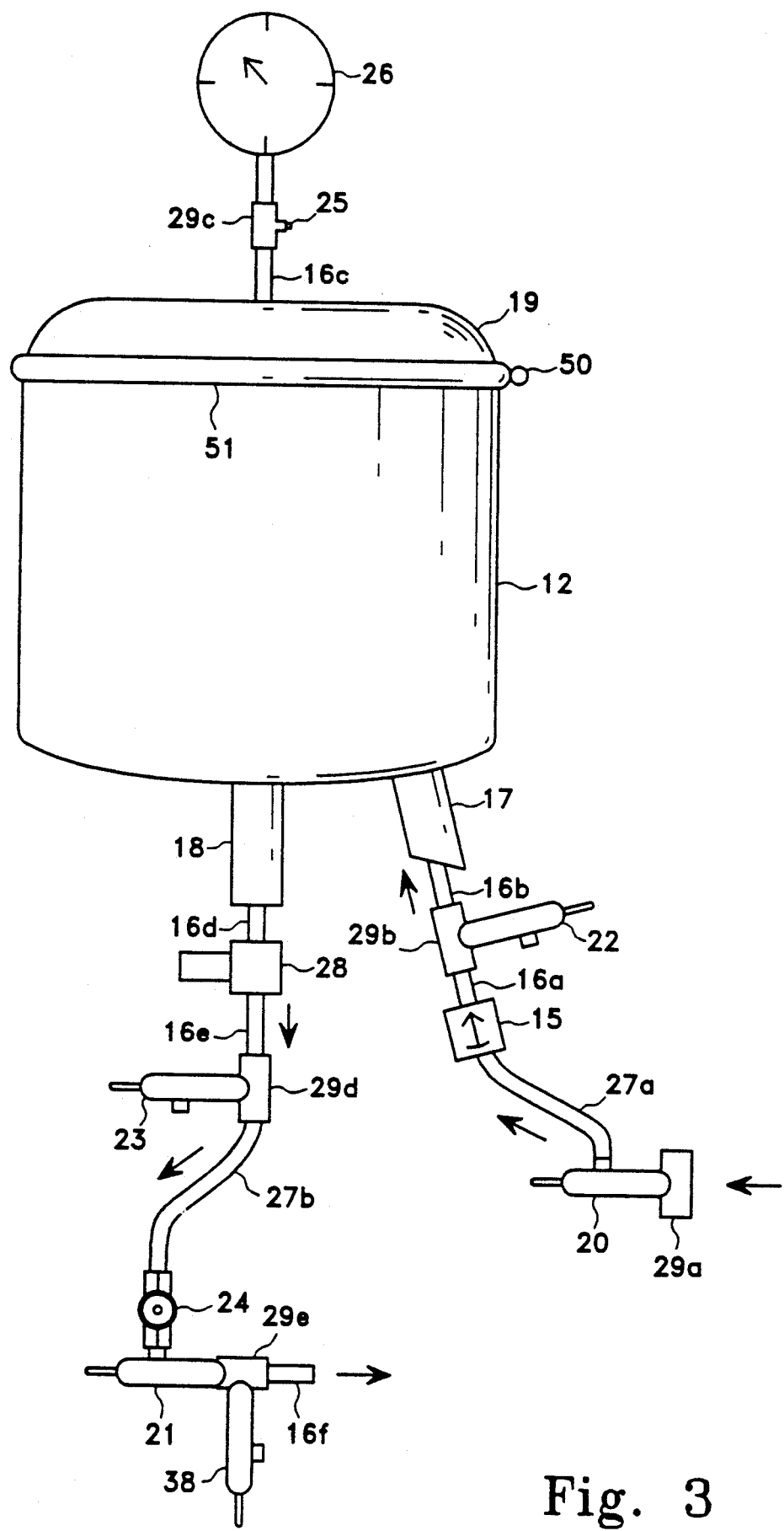
FIG. 3 is a side view of the bypass filter system. The arrows illustrate the direction of oil through the system.
Figure 4:
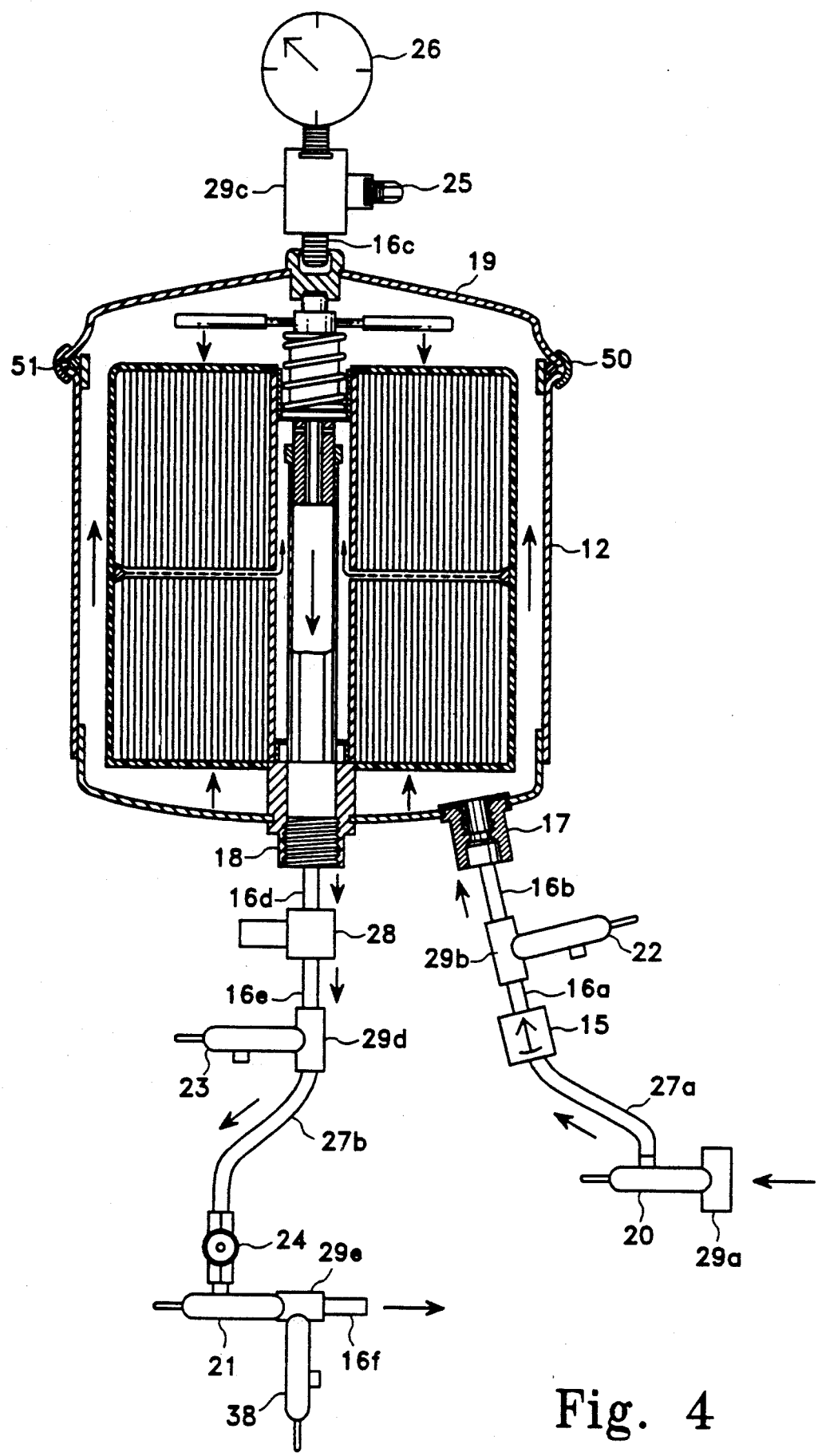
FIG. 4 is a cross-sectional view of the filter element housing. The arrows illustrate the direction of oil through the filter element.
Figure 5:
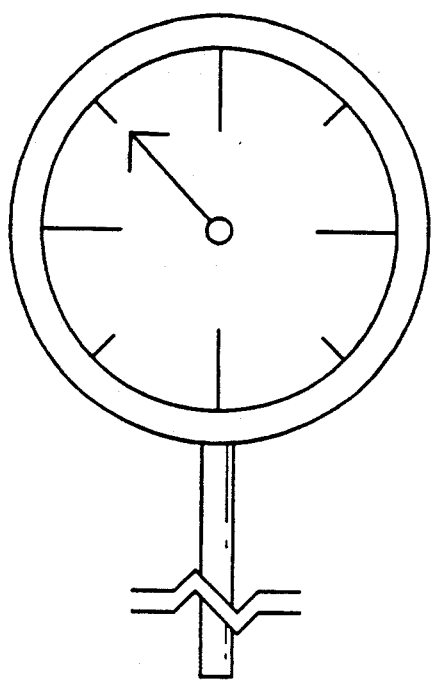
FIG. 5 is a close-up view of the attachment of "T" to the oil supply pressure gauge line.
Figure 5:
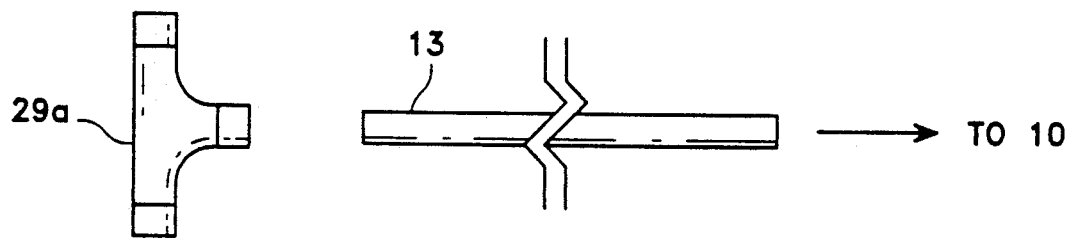
Figure 5:
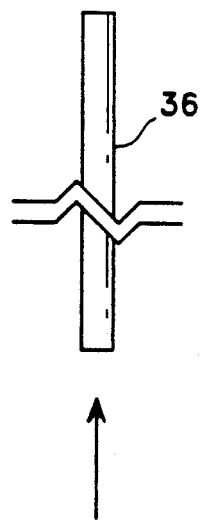

Referring now to FIGS. 2, 3 and 4, the flow of oil through the present invention may be more easily understood. The bypass filter system is divided into three sections, namely the inlet, filter, and outlet sections. Beginning first with the inlet section, oil is routed off of oil supply pressure gauge line (36). This is accomplished by installing "T" (29a) into oil supply pressure gauge line (36), as shown in FIG. 5, by using either a sweat fitting or a flair type union. Of course other designs may be just as suitable and perform as well. From this, inlet line shut-off (20) is located allowing the oil supply feeding into filtering system (10) to be turned off. From shut-off (20) a section of braided flex hose or oil conduit (27a) is connected to check valve (15). The braided reinforced hose is preferable to insure high quality, and durability, but other materials may be used if desired. Check valve (15) is used to prevent backwash of the filtered contaminants back into oil pump (32) when the equipment is turned off or operation discontinued for any reason. This is widely known and used by those skilled in the art. Brass closed nipple (16a) connects check valve (15) to "T" (29b). One opening of "T" (29b) is fitted with oil sample valve (22). This permits a sampling of the unfiltered oil to be taken without disrupting operation of the lubrication or refrigeration systems. Other advantages of this sample valve will be addressed later in this text.

By threading closed nipple (16b) into the last opening of "T" (29b) the filter section is now ready for connection to system (10). Inlet (17) of filter element housing (12) serves as such connection, in this embodiment. Within housing (12) filter element (11) is situated to function as the means for removing all possible sized particles, including those at the submicron level, as well as water and glycol contaminants. Such filtering elements as those described in U.S. Pat. Nos. 4,780,204 and 4,792,397 to Rasmussen, and manufactured by the Harvard Corporation have been found to be suitable for this process. The disclosure of these patents is hereby incorporated by reference. In addition, other filter element designs such as that disclosed in U.S. Pat. No. 4,929,354 to Meyering et al., and manufactured by Cuno, Incorporated, may be suitable for certain applications. It might even be possible to use several filtering and screening devices situated in a manner so that the removal of large and submicron particles are separately removed, as well as water and glycol contaminants.

Positioned within an opening in lid (19) of housing (12) is closed nipple (16c) to allow connection of "T" (29c). The remaining two openings of "T" (29c) are fitted with Schrader valve (25) and compound gauge (26). For added benefit a pressure transducer could be added to replace or act in conjunction with gauge (26). A transducer would allow warning devices to be attached to system (10) and activated when the internal pressure of housing (12) reached a preset value. Compound gauge (26) allows the continuous monitoring of the internal pressure of housing (12), which must be kept within certain tolerances as will be explained later. Furthermore, the use of a compound gauge is preferable (with or without the transducer) since during operation housing (12) is under an absolute positive pressure, while when turned off the internal pressure may be as low as negative 15" Hg (a vacuum). Gauge (26) must also be able to withstand the negative 25" Hg used to evacuate housing (12) after a change of filter element (11). Either of these processes would of course break, or at the very least upset the calibration of a standard pressure gauge. Schrader valve (25) is used to evacuate housing (12) after changing filter element (11). This process is explained in the discussion regarding the present invention's operation.

Finally, adjacent to inlet (17) is outlet (18) in housing (12) connected to closed nipple (16d). At the open end of closed nipple (16d) is attached means for metering oil flow (28). This valve may be a variable flow regulator, such as a needle valve, or a fixed flow regulator, such as a fixed orifice. While installing the present invention onto existing refrigeration equipment it is essential that the flow of filtered oil from filter element (11) be rigidly regulated. Furthermore, by regulating the flow at the outlet side of filter system (10) great advantages are afforded. Regulating the flow of oil makes it possible to balance the operation parameters of lubrication system (30) to ensure optimal operation, and filter system (10) to allow sufficient filtration. It is undesirable to allow the flow through filter (11) to be too great—this decreases the effectiveness of the water and submicron particle removal due to minimal retention of the oil in filter (11)—and it is undesirable to have the return flow too great as this will starve the lubricating system of oil, potentially causing catastrophic failure. A wide practice in the field has been to control the flow at the input side of filter system (10). This can only monitor how fast the oil goes in filter (11), but not how fast it comes out. By controlling the out flow the present invention can control both, and thus balance the necessary operation parameters of the various systems.

The next element is closed nipple (16e) threaded between one end of means for metering (28) and one opening of "T" (29d). To the remaining openings of "T" (29d) are sample valve (23) and a section of braided flex hose (27b). This carries the return oil flow to moisture eye (24). The purpose of moisture eye (24) is twofold. First, it serves to indicate the presence of water in the return flow oil. By doing so it may additionally indicate a problem with filter element (11), such as a clog or saturation. Either case would also cause a significant pressure increase within housing (12) and should therefore register on compound gauge (26) as well. In practical use the operator would notice the increased pressure recorded on gauge (26) and turn to moisture eye (24) for a verification that water exists in the return oil flow. If no moisture is showing in moisture eye (24) this may indicate a problem in calibration of gauge (26).

The second purpose of moisture eye (24) is to allow verification of return oil flow. Once again, in practical operation if gauge (26) is showing rapidly increasing pressure, the operator could look to moisture eye (24) which may indicate no current flow, thereby verifying a suboptimal condition, such as a clogged filter element (11).

Figure 6:
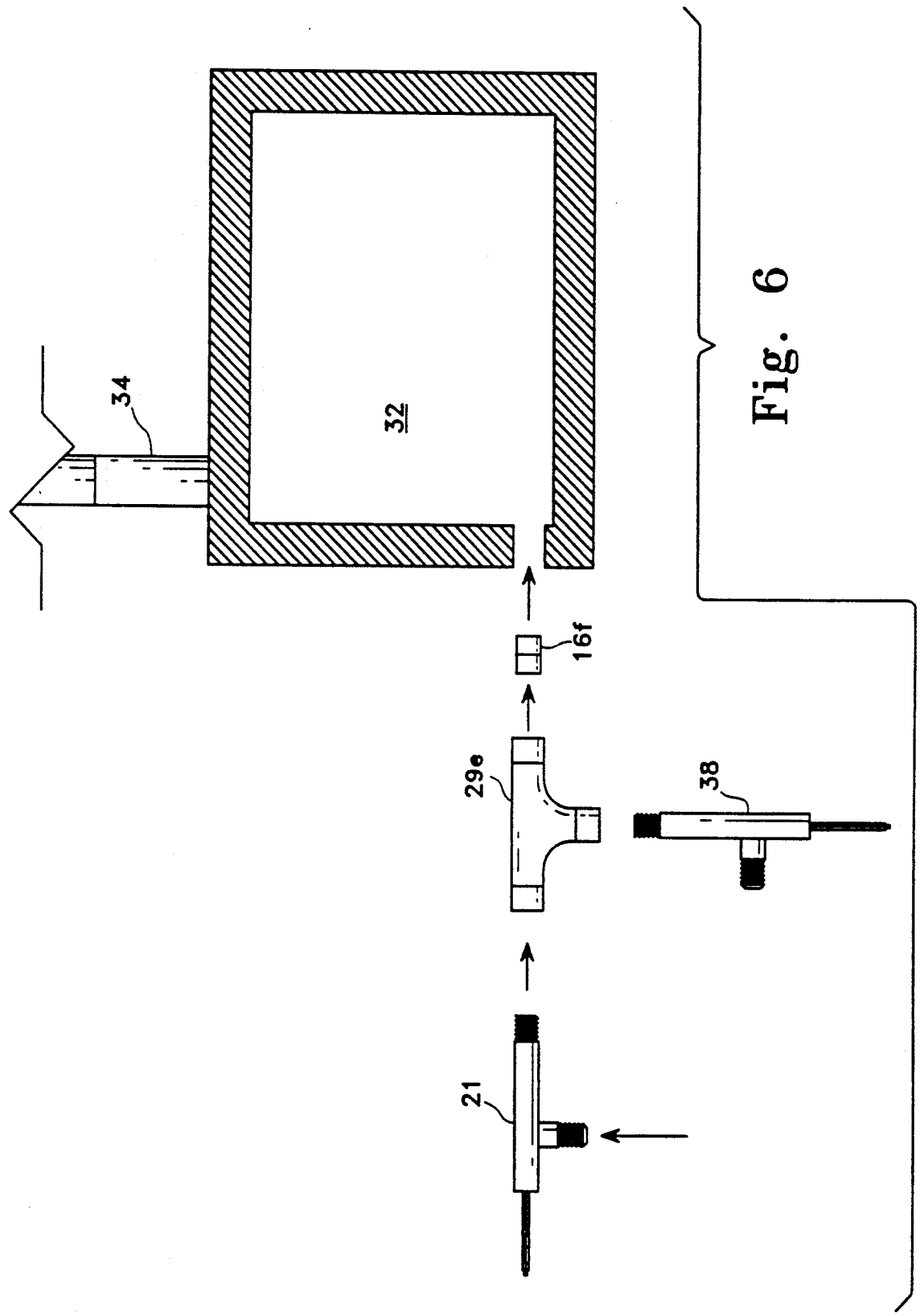
FIG. 6 is a close-up view showing diagrammatically the attachment of a closed nipple to the oil pump to displace the existing oil drain valve, which is relocated to an opening on the adjoining "T", also shown.

The flow route continues with return line shut-off valve (21) attached to the remaining opening on moisture eye (24). Valve (21) is then attached to one opening of "T" (29e). At this point, as can be seen in FIG. 6, existing drain valve (38) on oil pump (32) is removed and threaded to one of the remaining openings of "T" (29e), while the final opening is attached to closed nipple (16f). It is not intended that drain valve (38) should be removed entirely, as it may still be necessary to periodically drain the entire supply of oil. In such a case drain valve (38) is the most practical means for doing so. Closed nipple (16f) fits into the opening created by relocating drain valve (38) on oil pump (32) to complete the installation of the present invention.

The preceding discussion characterizes a single embodiment of the present invention. Many of the disclosed elements have suitable replacement components known by those skilled in the relevant field, and are too numerous to practically enumerate. Where suitable replacements are known it is intended that these components be included within the scope and spirit of the patent granted on the present invention.

In order to further understand the present invention it is desirable to discuss bypass filter system (10) as it functions in operation. The following discussion explains the attachment of bypass filter system (10) to existing equipment. Modifications may be necessary if the equipment is to be manufactured with filter system (10) attached. The present invention, as shown in FIG. 5, is attached to lubrication system (30) at oil supply pressure gauge line (36). Connection at this point is to ensure that no oil is taken from the oil supply line, causing possible starvation of lubrication system (30). Approximately 10% of the full flow of oil is routed by this connection to bypass filter system (10). For some older refrigeration equipment it may be desirable to route as much as 35% of the full flow of oil. Other equipment, for unknown reasons, may require a higher or lower percentage of oil flow. All of these systems may be accommodated by the present invention by diverting a greater percentage of the full flow to filter system (10). Continuing again with FIGS. 2, 3 and 4, the oil flows toward filter element housing (12) and it passes through shut-off (20). At this point the flow of oil to filter element housing (12) may be completely turned off. When utilized with shut-off (21) in return line (14), filter element housing (12) may be completely isolated from lubrication system (30). This isolation allows an operator to check or replace filter element (11) without shutting down refrigeration system (40). Current filtering designs, and even bypass filtering designs, do not incorporate means for isolating the filter element to allow changes, and evacuation of filtering system (10) during continuous operation of the refrigeration system. This alone is a significant advancement in the art.

As with any filter element, that used in the present invention should be replaced when it degrades to a suboptimal condition. The procedure for replacing filter element (11) is fairly uncomplicated. Shut-off (20) is closed off to discontinue flow from filter element (11) and then shut-off (21) is closed off to complete the isolation. This more effectively reduces the CFC's released into the atmosphere. It is then necessary to drain the oil in housing (12). Inlet sample valve (22) may be opened to accomplish this step, after housing (12) is opened to release the pressure. Then filter element housing (12) can be completely opened to reveal filter element (11). To open housing (12) is very uncomplicated, for this embodiment. Lid (19) is held in place by aviation band (50) which tightens lid (19) against "O" ring (51) to form a tight seal with filter housing (12). By loosening the t-bolt and nut on aviation band (50) the seal may be broken and lid (19) removed. After draining, the oil filter element (11) may be inspected for defects, or just replaced outright. Housing (12) is then closed up to conceal filter element (11). A vacuum pump is connected to housing (12) at Schrader valve (25) and activated to begin evacuating housing (12). This helps to remove any remaining water before continuing operation of filter system (10). When the evacuation is complete—typically housing (12) is taken down to a pressure of negative 25" Hg and held for 1 hour, three times—shut-off (20) is re-opened, and then shut-off (21) is also opened. The order of opening and closing shut-offs (20, 21) is important to avoid releasing CFC's into the atmosphere upon opening housing (12) and when filling housing (12) with new oil. The oil needs to flow in the direction of normal operation. Since no oil is present at check valve (15) the oil may move backwards through filter element (11), releasing entrapped contaminants, if shut-off (21) is opened first.

Schrader valve (25) also may be used to introduce new oil into lubrication system (30). The advantage of adding oil at this point is that the oil will be filtered before it reaches the moving parts of refrigeration system (40). While new oil may be relatively clean compared to used oil, it still may carry harmful submicron contaminants and water. By filtering the new oil with the present invention before it enters the lubrication system many of these contaminants can be removed immediately. Of course oil may still be added in the conventional manner as well.

During operation, before the oil flow reaches filter element housing (12) it passes through check valve (15). This valve is used as a one-way passage to allow for oil to enter filter housing (12) from inlet line (13), but to prevent a backwash of oil, including a concentration of contaminants, from housing (12) through inlet line (13) and into oil pump (32). The oil flow also passes by sample valve (22). Sample valve (22), as mentioned earlier, serves as a means for draining the oil from housing (12) before removal of filter element (11), but after isolation of bypass filter system (10). A similar valve, sample valve (23), is located in outlet line (14). Together the two valves provide a method for verifying proper operation of filter system (10). Each valve allows a sampling of oil to be taken from the respective lines (13) and (14). Sample valve (22) yields unfiltered oil, while valve (23) yields filtered oil. These samples may be tested to confirm that the filtered oil is indeed substantially free of water and contaminants. A comparison of the samplings would permit calculation of a filtering efficiency by the following formula:

$$\frac{\text{contaminants in unfiltered oil (ppm)} - \text{contaminants in filtered oil (ppm)}}{[\text{contaminants in unfiltered oil (ppm)}]} \times 100\%$$

The oil flow continues then until it enters filter element housing (12) where it engages filter element (11). The filtering process, of this embodiment, is described thoroughly in U.S. Pat. Nos. 4,780,204 and 4,792,397 both to Rasmussen, and assigned to the Harvard Corporation. These filter elements are currently those used in the present invention, because of their efficiency in removing submicron particles, and water. However, other filtering elements may exist which sufficiently remove at least some contaminants. It is anticipated that these filters could be used alone or in combination with other filters to accomplish the goals of the present invention.

The flow of oil at this point, and throughout inlet line (13) is under a positive pressure supplied by oil pump (32). This pressure is about 25 lbs, but, of course, may vary widely for other applications. At metering device (28) the pressure changes to a negative pressure. Also widely variable, but in the present embodiment it is about negative 15" Hg. The negative pressure is generated by the refrigerant itself as it undergoes a temperature change, and by the operation of compressor (41), as well. The absolute pressure of housing (12) is registered by compound gauge (26). This particular pressure set-up would normally cause a rapid exit of the oil from housing (12). The present invention has solved this problem by metering the flow of oil in outlet line (14).

The metering device used in the present embodiment is a needle valve. The needle valve allows the flow rate to be varied depending on the conditions of operation. This metering device is preferred when the present invention is initially connected, for reasons as discussed previously. When the operating conditions have been balanced, and a suitable flow rate has been found, the needle valve can be replaced with a corresponding fixed orifice valve.

Finally, the oil flow passes through sample valve (23), a section of braided flex hose (27b), moisture eye (24), and shut-off valve (21) and returns to oil pump (32). The reinforced hose is preferable because it resists the extensive mechanical and chemical abuses it is subjected to during operation.

When refrigeration system (40) is shut down, the negative pressure in outlet line (14) causes housing (12) to set with an internal negative pressure. This is inherent to only low pressure centrifugal type refrigeration equipment. Because no seal is perfect, there is naturally some leakage of atmosphere into the housing. Without proper filtration of this, contaminant refrigeration system (40) and lubrication system (30) will be subjected to unnecessary corrosive conditions. Others have used purge pumps to satisfy this problem, but this process releases environmentally harmful refrigerant into the atmosphere. The present invention's filtering means and methods allow removal of such contaminants without the release of these harmful side affects. While a purge pump will still be utilized because of its advantages to evacuate air from other areas of refrigeration system (40), it is intended that the run time due to water in lubrication system (30) can be significantly reduced.

Another problem which appears to be intrinsic to the centrifugal type equipment is the use of a water-cooled oil pump. In some instances the water filled coils which contact the oil within pump (32) will leak water. Likewise, the condenser and the evaporator section of refrigeration system (40) contain water, and sometimes glycol. In the event of a leak in these systems the water/glycol can migrate into the oil. These leaks cause an inordinate amount of moisture in the oil flow which may be undetectable for some time in the systems of the prior art until minor damage or even catastrophic failure has occurred. However, the present invention permits detection of these leaks. As the oil is filtered in filter element (11) the removed water causes slight increases in the housing pressure. As large amounts of water are removed the increase in pressure is quite dramatic exhibiting a suboptimal condition of filter element (11), as it is indicated by gauge (26). At this point, when such a pressure increase is noticed, the operator has several options to prevent catastrophic failure within the system.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied.

I claim:

1. A bypass filter system for use in low pressure centrifugal refrigeration equipment having a lubricating system and oil supply, comprising:
   a. a means for transferring a proportion of oil, wherein said means comprises;
      (1) an inlet line;
      (2) an inlet shut-off valve attached to said inlet line; and
      (3) a positive pressure maintained within said inlet line;
   b. a means for filtering said proportion of oil, wherein said means comprises:
      (1) means for removing water, particles of at least one micron in size, and particles less than one micron is size; and
      (2) a canister for housing said means for removing water, particles of at least one micron in size, and particles less than one micron in size, and wherein each of said means for removing is accomplished by at least a single fibrous filter element;
   c. a means for changing said fibrous filter element during continued operation of said refrigeration system;
   d. a means for returning oil comprising;
      (1) an outlet line;
      (2) an outlet shut-off valve attached to said outlet line; and
      (3) a negative pressure maintained within said outlet line;

e. a means for allowing evacuation of said means for filtering wherein said means for allowing is integral to said canister; and f. a means for isolating said means for filtering, wherein said means comprises said inlet shut-off valve and said outlet shut-off valve.

2. A bypass filter system as described in claim 1 and further comprising a means for balancing operating parameters of said filtering system to allow sufficient filtration of said oil without starving said lubricating system of oil.

3. A bypass filter system as described in claim 2 and further comprising a means for controlling the flow of said oil through said means for filtering, said means for controlling being integral to said means for returning oil.

4. A bypass filter system as described in claim 3 wherein said means for controlling flow is variable.

5. A bypass filter system as described in claim 3 wherein said means for controlling flow is fixed.

6. A bypass filter system as described in claim 5 wherein said means for controlling flow is a fixed orifice.

7. A bypass filter system as described in claim 4 wherein said means for controlling flow is a needle valve.

8. A bypass filter system for use in low pressure centrifugal refrigeration equipment having a lubricating system and oil supply, comprising:
   a. a means for filtering said oil, wherein said means is maintained at an absolute positive pressure;
   b. a means for transferring a proportion of oil from said supply to said means for filtering, wherein said oil is subjected to a positive pressure within said means for transferring;
   c. a means for returning said proportion of oil to said supply from said means for filtering, wherein said oil is subjected to a negative pressure within said means for returning;
   d. a means for balancing operating parameters of said filter system to allow submicron filtration of said oil without starving said lubricating system of oil.

9. A bypass filter system as described in claim 8 wherein said means for balancing comprises a means for controlling flow of lubricating oil through said means for filtering, said means for controlling being integral to said means for returning oil.

10. A bypass filter system as described in claim 9 wherein said means for controlling flow is variable.

11. A bypass filter system as described in claim 9 wherein said means for controlling flow is fixed.

12. A bypass filter system as described in claim 8 wherein said means for filtering said proportion of oil comprises:
   (1) a means for removing submicron contaminants; and
   (2) a canister for housing said means for removing.

13. A bypass filter system as described in claim 8 wherein said means for transferring a proportion of oil comprises:
   (1) an inlet line; and
   (2) an inlet shut-off valve.

14. A bypass filter system as described in claim 13 wherein said means for returning oil comprises:
   (1) an outlet line; and
   (2) an outlet shut-off valve.

15. A bypass filter system as described in claim 8 or 14 and further comprising a means for isolating said means for filtering.

16. A bypass filter system as described in claim 15 wherein said means for isolating comprises said inlet filter shut-off attached to said inlet line and said outlet filter shut-off attached to said outlet line.

17. A bypass filter system as described in claim 16 wherein said means for isolating further comprises a means for allowing evacuation of said means for filtering, wherein said means for allowing is integral to said canister.

18. A bypass filter system as described in claim 17 wherein said means for allowing evacuation is a Schrader valve fitting.

19. A bypass filter system as described in claim 14 and further comprising a means for detecting moisture in said oil after filtering said oil.

20. A bypass filter system as described in claim 19 wherein said means for detecting comprising a moisture eye.

21. A bypass filter system as described in claim 14 and further comprising a means for verifying return oil flow, and wherein said means for verifying comprises a moisture eye.

22. A bypass filter system as described in claim 8 wherein said means for balancing comprises a means for optimizing retention of said oil in said means for filtering.

23. A bypass filter system as described in claim 22 wherein said means for optimizing retention is variable.

24. A bypass filter system as described in claim 22 wherein said means for optimizing retention is fixed.

25. A bypass filter system for use in low pressure centrifugal refrigeration equipment having a lubricating system and oil supply, comprising:
   a. a means for transferring a proportion of oil from said oil supply, wherein said means for transferring comprises:
      (1) an inlet line; and
      (2) a means for maintaining a positive pressure within said inlet line;
   b. a means for filtering said oil, wherein said means for filtering comprises:
      (1) a means for removing submicron contaminants; and
      (2) a canister for housing said means for removing.
   c. a means for returning oil to said oil supply, wherein said means for returning comprises:
      (1) an outlet line; and
      (2) a means for maintaining a negative pressure within said outlet line;
   d. a means for changing said means for removing contaminants during continued operation of said refrigeration system.

26. A bypass filter system as described in claim 25 wherein said means for changing comprises a means for isolating said means for filtering, and wherein said means for isolating comprises:
   a. inlet filter shut-off attached to inlet line; and
   b. outlet filter shut-off attached to outlet line.

27. A bypass filter system as described in claim 26 wherein said means for isolating further comprises a means for allowing evacuation of said means for filtering, wherein said means for allowing is integral to said canister.

28. A bypass filter system as described in claim 8 or 25 and further comprising a means for verifying proper operation of said means for filtering during operation of said refrigeration equipment.

29. A bypass filter system as described in claim 28 wherein said means for verifying proper operation comprises a means for sampling pre and post filtered oil.

30. A bypass filter system as described in claim 12 or 25 wherein said means for filtering further comprises a means for removing water, and wherein said means for removing water is integral to said means for removing submicron contaminants, and further wherein said means for removing water and submicron contaminants comprises a fibrous filter.

31. A bypass filter system as described in claim 30 wherein said means for filtering further comprises a means for removing glycol, wherein said means for removing glycol comprises said fibrous filter.

32. A bypass filter system as described in claim 30 wherein said means for removing water comprises a submicron filter element.

33. A bypass filter system as described in claim 32 and further comprising a means for detecting a clogged filter element.

34. A bypass filter system as described in claim 33 wherein said means for detecting comprising a compound pressure gauge.

35. A bypass filter system as described in claim 8 or 25 and further comprising a means for determining the presence of a water leak in said refrigeration equipment.

36. A bypass filter system as described in claim 35 wherein said means for determining comprising a compound pressure gauge.

37. A bypass filter system as described in claim 36 wherein said means for filtering comprises a canister housing a submicron filter and wherein said housing has a Schrader fitting, said compound pressure gauge being attached to said Schrader fitting, and wherein said system further comprises a means for verifying the calibration of said pressure gauge.

38. A bypass filter system as described in claim 37 wherein said means for verifying comprising a means for detecting moisture in said outlet line.

39. A bypass filter system as described in claim 8 or 25 wherein said proportion of oil transferred is in the range of 2-35% of full flow.

40. A bypass filter system as described in claim 8 or 25 wherein said proportion of oil transferred is in the range of 10-15% of full flow.

41. A bypass filter system as described in claim 40 wherein said proportion of oil drawn off is preferably 10% of full flow.

42. A bypass filter system for use in low pressure centrifugal refrigeration equipment having a lubricating system and oil supply, comprising:
   a. a means for transferring a proportion of oil comprising;
      (1) an inlet shut-off valve;
      (2) an inlet line; and
      (3) a positive pressure within said inlet line;
   b. a means for filtering said proportion of oil comprising:
      (1) a means for removing water, particles of at least one micron in size, and particles of less than one micron in size; and
      (2) a canister for housing said means for removing water, particles of at least one micron in size, and particles of less than one micron in size;
   c. a means for returning oil comprising;
      (1) an outlet line;
      (2) an outlet shut-off valve; and
      (3) a negative pressure within said outlet line;
   d. a means for allowing evacuation of said means for filtering, wherein said means for allowing is integral to said canister; and
   e. a means for isolating said means for filtering.

43. A bypass filter system as described in claim 42 wherein said means for isolating comprises said inlet shut-off attached to said inlet line and said outlet shut-off attached to said outlet line.

44. A bypass filter system as described in claim 43 wherein said means for allowing evacuation is a Schrader valve and wherein said Schrader valve is attached to said canister.

45. A bypass filter system as described in claim 25 or 42 and further comprising a means for balancing operating parameters of said filtering system to allow sufficient filtration of said oil without starving said lubricating system of oil.

* * * * *